(12) United States Patent
Rincon

(10) Patent No.: US 9,523,768 B1
(45) Date of Patent: Dec. 20, 2016

(54) DIGITAL BEAMFORMING INTERFEROMETRY

(71) Applicant: The United States of America as represented by the Administrator of the National Aeronautics and Space Administration, Washington, DC (US)

(72) Inventor: Rafael F. Rincon, Greenbelt, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 116 days.

(21) Appl. No.: 14/501,456

(22) Filed: Sep. 30, 2014

(51) Int. Cl.
  *G01S 13/524* (2006.01)
  *G01S 13/90* (2006.01)
  *G06T 7/00* (2006.01)

(52) U.S. Cl.
  CPC ......... *G01S 13/9023* (2013.01); *G06T 7/0081* (2013.01); *G06T 2207/10044* (2013.01); *G06T 2207/30181* (2013.01); *G06T 2207/30232* (2013.01)

(58) Field of Classification Search
  CPC .. G01S 13/9023; G01S 13/89; G01S 13/9035; G01S 3/46
  USPC .................................................. 342/156, 25
  See application file for complete search history.

(56) References Cited

U.S. PATENT DOCUMENTS 5,818,383 A * 10/1998 Stockburger .............. G01S 3/46
                                                                          342/109

* cited by examiner

*Primary Examiner* — Timothy A Brainard

(57) ABSTRACT

A method according to an illustrative embodiment includes generating first, second, third, and fourth signals. The method also includes transmitting from an antenna, the first signal, and transmitting the antenna, the second signal. The first and second signals are configured such that when the signals are transmitted simultaneously the signals constructively interact to form a first beam signal. The first beam signal has a first look angle. The method also includes transmitting from the antenna the third signal and from the antenna the fourth signal. The third and fourth signals are configured such that when the signals are transmitted simultaneously the signals constructively interact to form a second beam signal. The second beam signal has a second look angle. The method also includes receiving a first and second reflected signals and generating an interferogram utilizing information in the first and second reflected signals.

20 Claims, 8 Drawing Sheets

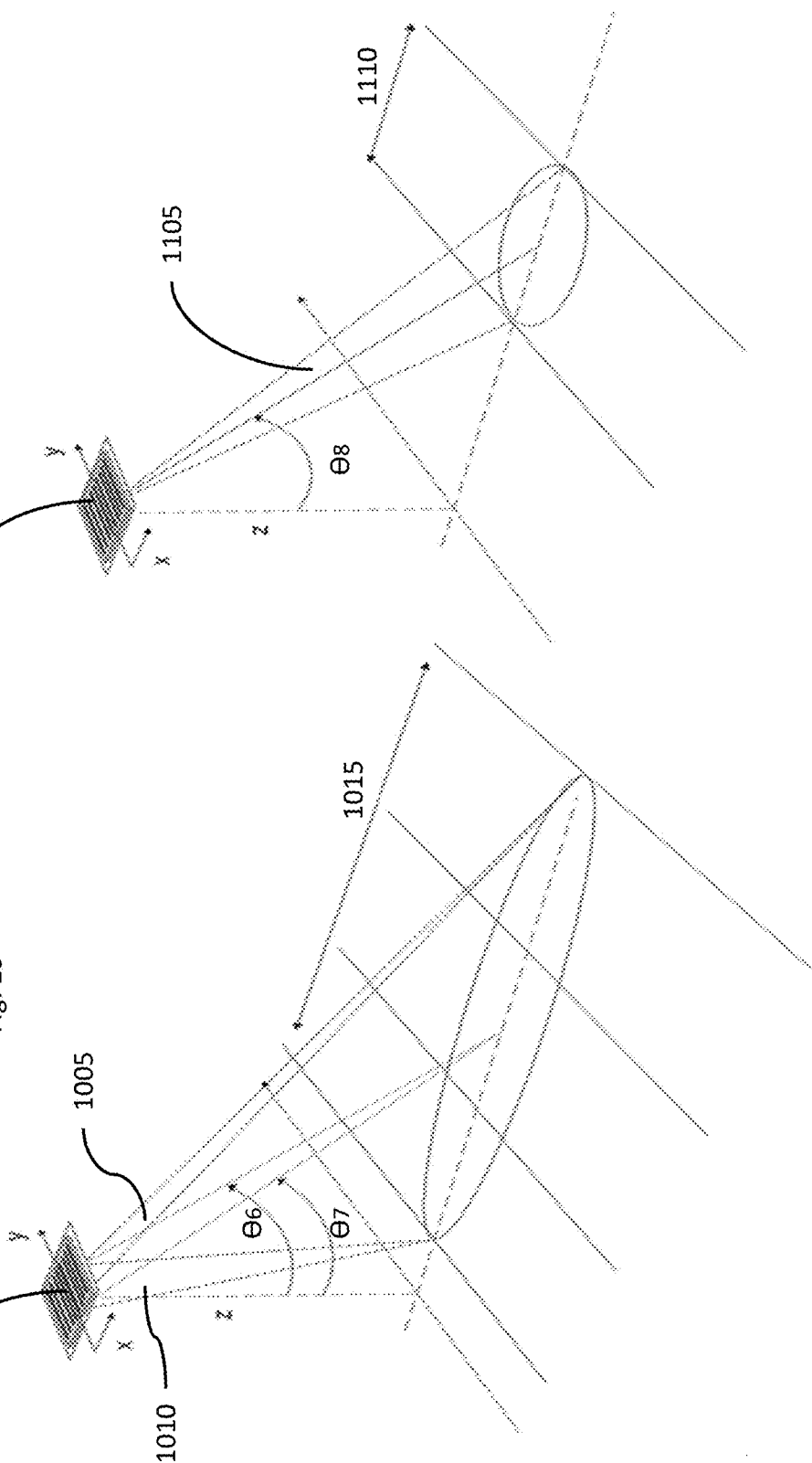

DIGITAL BEAMFORMING INTERFEROMETRY

BACKGROUND

Airborne or spaceborne Syntheic Aperture Radar (SAR) can be used in a variety of ways, and is often used to generate two dimensional images of a surface. SAR involves the use of radio waves to determine presence, properties, and features of extended areas. Specifically, radio waves are transmitted in the presence of a ground surface. A portion of the radio wave's energy is reflected back to the radar system, which allows the radar system to detect and image the surface. Such radar systems may be used in science applications, military contexts, and other commercial applications.

SUMMARY

A method according to an illustrative embodiment includes generating, by a processor of a computing device, a first signal, a second signal, a third signal, and a fourth signal. Each of the first, second, third, and fourth signals have a frequency, a phase, and an amplitude. The method also includes transmitting, by the processor, from a first sub-array of a plurality of sub-arrays of an antenna, the first signal. The method also includes transmitting, by the processor, from a second sub-array of the antenna, the second signal. The first signal amplitude, frequency, and phase, as well as the second signal amplitude, frequency, and phase, are configured such that when the first signal and the second signal are transmitted simultaneously the first signal and the second signal constructively interact to form a first beam signal. The first beam signal is configured to have a first look angle. The method also includes transmitting, by the processor, from a third sub-array of the antenna, the third signal. The method further includes transmitting, by the processor, from a fourth sub-array of the antenna, the fourth signal. The third signal amplitude, frequency, and phase, as well as the fourth signal amplitude, frequency, and phase, are configured such that when the third signal and the fourth signal are transmitted simultaneously the third signal and the fourth signal constructively interact to form a second beam signal. The second beam signal is configured to have a second look angle. The method also includes receiving a first reflected signal by at least one sub-array of the plurality of sub-arrays of the antenna. The first reflected signal includes a reflected portion of the first beam signal, and the reflected portion of the first beam signal has been reflected off of a first region within the first look angle. The method further includes receiving a second reflected signal by at least one sub-array of the plurality of sub-arrays of the antenna. The second reflected signal includes a reflected portion of the second beam signal, and the reflected portion of the second beam signal has been reflected off of a second region within the second look angle. The method further includes generating, by the processor, an interferogram utilizing information in the first reflected signal and the second reflected signal.

An apparatus according to an illustrative embodiment includes a memory, a processor coupled to the memory, and a set of instructions stored on the memory and configured to be executed by a processor. The instructions include instructions to generate a first signal, a second signal, a third signal, and a fourth signal. Each of the first, second, third, and fourth signals have a frequency, a phase, and an amplitude. The instructions also include instructions to transmit, from a first sub-array of a plurality of sub-arrays of an antenna, the first signal. The instructions also include instructions to transmit, from a second sub-array of the antenna, the second signal. The first signal amplitude, frequency, and phase, as well as the second signal amplitude, frequency, and phase are configured such that when the first signal and the second signal are transmitted simultaneously the first signal and the second signal constructively interact to form a first beam signal. The first beam signal is configured to have a first look angle. The instructions also include instructions to transmit, from a third sub-array of the antenna, the third signal. The instructions also include instructions to transmit, from a fourth sub-array of the antenna, the fourth signal. The third signal amplitude, frequency, and phase, as well as the fourth signal amplitude, frequency, and phase are configured such that when the third signal and the fourth signal are transmitted simultaneously the third signal and the fourth signal constructively interact to form a second beam signal. The second beam signal is configured to have a second look angle. The instructions also include instructions to receive a first reflected signal by at least one sub-array of the plurality of sub-arrays of the antenna. The first reflected signal includes a reflected portion of the first beam signal, and the reflected portion of the first beam signal has been reflected off of a first region within the first look angle. The instructions also include instructions to receive a second reflected signal by at least one sub-array of the plurality of sub-arrays of the antenna. The second reflected signal includes a reflected portion of the second beam signal, and the reflected portion of the second beam signal has been reflected off of a second region within the second look angle. The instructions also include instructions to generate an interferogram utilizing information in the first reflected signal and the second reflected signal.

An illustrative non-transitory computer readable medium has instructions stored thereon that, upon execution by a computing device, cause the computing device to perform the operations including generating a first signal, a second signal, a third signal, and a fourth signal. Each of the first, second, third, and fourth signals have a frequency, a phase, and an amplitude. The operations also include transmitting, from a first sub-array of a plurality of sub-arrays of an antenna, the first signal. The operations also include transmitting, from a second sub-array of the antenna, the second signal. The first signal amplitude, frequency, and phase, as well as the second signal amplitude, frequency, and phase are configured such that when the first signal and the second signal are transmitted simultaneously the first signal and the second signal constructively interact to form a first beam signal. The first beam signal is configured to have a first look angle. The operations also include transmitting, from a third sub-array of the antenna, the third signal. The operations also include transmitting, from a fourth sub-array of the antenna, the fourth signal. The third signal amplitude, frequency, and phase, as well as the fourth signal amplitude, frequency, and phase are configured such that when the third signal and the fourth signal are transmitted simultaneously the third signal and the fourth signal constructively interact to form a second beam signal. The second beam signal is configured to have a second look angle. The operations also include receiving a first reflected signal by at least one sub-array of the plurality of sub-arrays of the antenna. The first reflected signal includes a reflected portion of the first beam signal, and the reflected portion of the first beam signal has been reflected off of a first region within the first look angle. The operations also include receiving a second reflected signal by at least one sub-array of the plurality of sub-arrays of the antenna. The second reflected signal includes a reflected portion of the second beam signal, and the reflected portion of the second beam signal has been reflected off of a second region within the second look angle. The operations also include generating an interferogram utilizing information in the first reflected signal and the second reflected signal.

BRIEF DESCRIPTION OF THE DRAWINGS

Illustrative embodiments will hereafter be described with reference to the accompanying drawings.

FIG. 10 is a diagram illustrating a radar system used for digital beamforming interferometry in a receive beamforming mode demonstrating a transmit configuration in accordance with an illustrative embodiment.

FIG. 11 is a diagram illustrating a radar system used for digital beamforming interferometry in a receive beamforming mode demonstrating a receive configuration in accordance with an illustrative embodiment.

DETAILED DESCRIPTION

Figure 1:
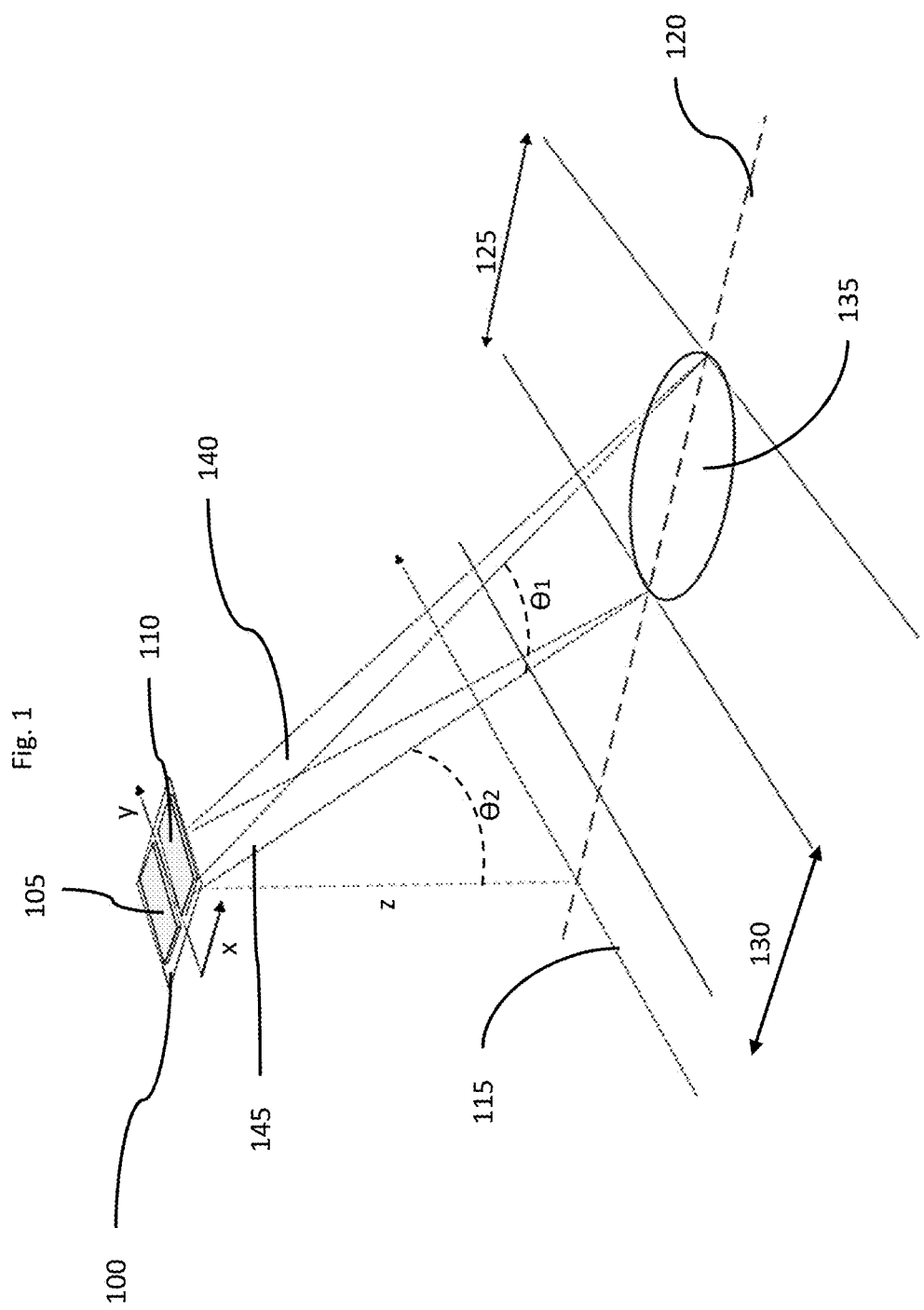
FIG. 1 is a diagram illustrating a radar system used for digital beamforming interferometry in a transmit beamforming mode in accordance with an illustrative embodiment.

Described herein are illustrative embodiments for methods and systems for utilizing digital beamforming in generating interferograms. In one illustrative embodiment, such methods and systems may be used on an aircraft or spacecraft radar system to take measurements of the surface of the earth or objects on the surface of the earth.

A method according to an illustrative embodiment includes generating images in three dimension space using a single SAR system with a multiple-channel radar architecture. The method includes obtaining through a computing device, multiple transmit and receive radar channels from a plurality of sub-arrays of an antenna. The method further includes obtaining two or more two-dimensional SAR images of the same region of a ground surface with slightly different look angles. The difference in phase between the images, known as the interferometric phase, is used to obtain a new image of the third spatial dimension.

The method can be achieved by either one of two reciprocal approaches. In the first approach all the radar transmit signals are generated to form a single transmit beam of energy on either side of the flight track. On receive, the reflected energy from the ground is collected by each individual channel and processed as two or more individual receive beams. In the second approach, individual signals are transmitted (by means of time multiplexing or encoding each of the signals) to generate two or more transmit beams. On receive, the reflected energy from the ground is collected by each individual channel and processed as a single receive beam.

In the first approach, the processor generates all the signals with the appropriate amplitude and phases such that when the signals are simultaneously transmitted, the radar generates and steers a single beam of energy to either side of the radar track. The approach also includes receiving the reflected energy by at least two sub-arrays of the plurality of sub-arrays of the antenna. Each of the sub-array signals is processed as an individual beam of energy using SAR focusing techniques to generate an image of the surface. Because of the spatial displacement between the sub-arrays, each of the receive beams views the same region of the ground at a different look angle. The resulting phase difference between the SAR images, called interferometric phase, is proportional to the height of the imaged features in the scene (i.e., the ground surface or objects on the ground surface). The approach further includes generating, by the processor or an offline computer, an interferogram utilizing the phase information between two images.

Another illustrative embodiment includes a memory, a processor coupled, to the memory, and a set of instructions stored on the memory and configured to be executed by a processor. The instructions include instructions that command the processor to generate transmit signals, where each signal is generated with a prescribed frequency, amplitude, and phase. The instructions also command the processor to transmit a particular signal from a particular radar channel corresponding to a particular sub-array of an antenna. The signals frequency, amplitude, and phase can be configured such that when transmitted simultaneously, the signals constructively interact to form a single beam of energy pointed at a specific location. When transmitted individually (time multiplexed or phase encoded), each signal forms a wide beam of energy. A similar wide beam can be achieved when transmitting all the signals simultaneously but using proper phasing among the signals. This is known as phase spoiling. In this way, the SAR system can be configured to form a single transmit beam as in the first approach, or two or more transmit beams with different phase centers, as in the second approach.

The system and methods disclosed herein can also receive all the reflected signals by using a plurality of sub-arrays of an antenna. The received signals are processed depending on either one of the transmit approaches employed. If a single beam is generated on transmit, the received signals are processed as two or more receive beams with different phase centers. If two or more beams are generated on transmit, the received signals are processed as a single receive beam. The system and methods then can generate one or more interferograms utilizing the phase information among images.

A radar system transmits radio waves and senses a part of the transmitted radio waves that are reflected back to an antenna. This allows the radar to determine the location of objects that are reflecting back waves. In interferometry, a radar system generates two separate images of what is being reflected back from transmitted waves. Each of the images is viewed from a slightly different look angle. The two images can be combined to yield an interferogram that shows the object's location in three dimensional space. For example, if such a radar is installed on an aircraft, the aircraft may fly over a particular part of land. The radar may transmit radio waves as it flies over the part of land and record the radio waves that are reflected back. The data generated from recording the reflected back radio waves can be used to generate a first image of the part of land. The aircraft could then fly over the part of land a second time to generate a second image. The two images are then combined to yield the interferogram. In another example, an aircraft may carry on board two radar systems with two separate antenna. In this example, both radar systems can be run during one pass across the part of land. In this way, both images for an interferogram can be generated during one pass.

Advantageously, using the system and methods described herein, an interferogram can be generated doing a single pass and only utilizing one radar system and antenna array. Furthermore, the system and methods disclosed herein yield an interferogram with good resolution. Interferograms as generated by the methods and systems disclosed herein are capable of showing not only topography, but also, for example, biomass, canopies, buildings, etc.

The disclosed systems and methods may be referred to as an Interferometric Syntheic Aperture Radar (InSAR) that utilizes digital beamforming. InSAR is a radar technique that provides three-dimensional information from Synthetic Aperture Radar (SAR) images. In other words, SAR is used to acquire the two images needed for an interferogram, yielding InSAR. As discussed above, InSAR can be implemented with conventional SAR systems in repeat pass flight configuration where interferograms between two SAR images of the same area are generated by flying the radar in two near-identical tracks; or in a single pass configuration where interferograms between two SAR images of the same area are generated using two antennas. Additional information on SAR techniques and physical components of a SAR can be found in Rafael F. Rincon et al., Digital Beamforming Synthetic Aperture Radar (DBSAR) Polarimetric Upgrade (2011) and Rafael Rincon et al., *NASA's L-Band Digital Beamforming Synthetic Aperture Radar*, IEEE Transactions on Geosciences and Remote Sensing vol. 49, no. 10 at 3622 (October 2011), the disclosures of which are both incorporated herein by reference in their entirety.

An illustrative embodiment of the systems and methods disclosed herein describes an InSAR system that utilizes a single pass flight configuration with a beamforming radar and a single antenna array. In this embodiment, the beamforming radar is a multi-channel radar system that employs an antenna made up of many elements arranged as sub-arrays. This radar architecture is characterized by a multi-channel operation with software defined wave form generation for each radar transmit channel and a dedicated digital receiver channel for each transmit channel. The antenna sub-arrays in this embodiment are aligned in the flight direction permitting relative amplitude and phase measurements between pairs of radar channels or among groups of radar channels. An example beamforming radar architecture will be discussed below with respect to FIG. 3. Such a beamforming radar architecture allows for the implementation of a multi-channel beamforming radar that allows the synthesis of two or more beams, either in a transmit mode or a receive mode, which in turn can yield pairs of SAR images to generate an interferogram.

Advantageously, the systems and methods disclosed herein make possible advanced radar techniques not possible with conventional radars. Beamforming uses interference among the signals from each of the antenna sub-arrays to generate far-field beam patterns with predefined scan angle, beam-width, and and/or sidelobe level. In transmit beamforming, a radar can use software-defined waveforms to control the amplitude and phase of the signals at each transmitter channel in order to create a pattern of constructive and destructive interference in the wavefront. In receive beamforming, the radar digitizes the return reflected radar signal and uses digital signal processing to attenuate and phase shift the digitized radar returns and generate the far-field beam patterns at the desired scan angles and characteristics.

Using beamforming as disclosed herein, many advantages can be realized. For example, multiple antenna beams can be synthesized simultaneously or time-interleaved, depending on the implementation of different InSAR techniques. The synthesis of two or more transmit or receive antenna beams provides the basis for interferometry. The images collected with each of the antenna beams provide the interferograms that carry three dimensional information of what was scanned by the radar. Since beam generation is performed digitally (whether in transmit mode with software-defined waveforms, or in receive mode with digitized return signal data), the system may synthesize beams in varying directions (or look angles) on both sides of the radar flight-track. Additional advantages of the systems and methods disclosed herein include an increase in the measurement swath without reducing received antenna gain and the suppression of ambiguities or localized interference in the receiver signal by appropriate null-steering of the antenna pattern.

Digital beamforming interferometry may be useful in many applications. The systems and methods disclosed herein enable InSAR measurements using single antenna radars reducing complexity. The methods and systems disclosed herein add a third dimension to the two dimensional mapping capability of SAR systems.

FIG. 1 is a diagram illustrating a radar system 100 used for digital beamforming interferometry in a transmit beamforming mode in accordance with an illustrative embodiment. In alternative embodiments, fewer, additional, and/or different components may be included in the system. This embodiment corresponds to the first approach discussed above where the radar transmit signals are generated to form a single transmit beam of energy on either side of the flight track and, on receive, the reflected energy from the ground is collected by each individual channel and processed as two or more individual receive beams. In the embodiment of FIG. 1, the radar system 100 is configured to be on an aircraft. The radar system 100 includes antenna subgroups 105 and 110. Each antenna subgroup 105 and 110 is made up of 4 sub-arrays each in this embodiment, yielding 8 sub-arrays total (as will be discussed at length below with respect to FIG. 3). Other configurations are possible for the antenna of the radar system 100. For example, the antenna may have 4 sub-arrays total, 5 sub-arrays total, 6 sub-arrays total, 7 sub-arrays total, 9 sub-arrays total, 10 sub-arrays total, 12 sub-arrays total, or another total number of sub-arrays. Additionally, even though in this embodiment the 8 sub-arrays are divided into two antenna subgroups 105 and 110, having 4 sub-arrays each, this grouping is not a physical difference between sub-arrays. In other words, the subgroups are defined by what types of signals are being output from the sub-arrays. In this embodiment, the 4 sub-arrays in antenna subgroup 105 are outputting similar signals that form a beam signal 145, so the 4 sub-arrays in antenna subgroup 105 are identified together. Similarly, the 4 sub-arrays in antenna subgroup 110 are outputting similar signals in this embodiment that form a beam signal 140, so the 4 sub-arrays in antenna subgroup 110 are identified together. In this embodiment, beam signals 140 and 145 are time multiplexed or are phase encoded to ensure that the two beam signals can be uniquely identified upon receive.

Since the subgroups 105 and 110 are defined by the signals being output from the sub-arrays, the subgroups 105 and 110 can vary in alternative embodiments depending on signals that are being output from the various sub-arrays. The present embodiment shown in FIGS. 1-3 has 8 sub-arrays. In an alternative embodiment still having 8 sub-arrays, there may be 4 subgroups containing 2 sub-arrays each. Other various possibilities for subgroups and the purposes for having different subgroups for the creation of different beam signals is included throughout the present disclosure.

The radar system 100 having subgroups 105 and 110 is on an aircraft that is moving along the y-axis. The y-axis is also referred to as the along-track dimension. The along-track dimension is parallel to the ground flight track line 115. The ground flight track line 115 shows a line on the ground that follows the flight track of the aircraft, and in general corresponds to the part of the surface of the earth that the aircraft is closest to during a flight. The x-axis shown in FIG. 1 referred to as the across-track dimension. The across-track dimension is orthogonal to the along-track dimension. The z-axis shown in FIG. 1 is orthogonal to both the along-track dimension (y-axis) and the across-track dimension (z-axis). The height of the aircraft can be measured along the z-axis, and the z-axis as shown in FIG. 1 connects the flight track of the aircraft and the ground flight track line 115.

Across-track ground line 120 is parallel to the x-axis and is orthogonal to the ground flight track line 115. The across-track ground line 120 shows the area on the ground that can be scanned by across-track radar beams. In this embodiment, the radar system 100 is aligned to scan areas of the ground along (and incidentally nearby as shown by surface beam region 135) the across-track ground line 120. In this embodiment, the sub-arrays of the antenna in the subgroups 105 and 110 are each aligned to be parallel with the along-track dimension (y-axis). In this way signals can be transmitted from the radar system 100 that can constructively combine to create beam signals that can scan the ground anywhere along the across-track ground line 120. Where the beam signals are not formed, the transmitted signals destructively interact. In other words, any angle $\theta_2$ can be used to scan the ground, where angle $\theta_2$ represents the angle between the z-axis and the edge of the beam signals nearest the z-axis. In other embodiments, the radar system could be aligned to scan in other directions with respect to the along-track dimension (or y-axis).

The radar system 100 in FIG. 1 operates by transmitting signals from the sub-arrays in the subgroups 105 and 110. The signals transmitted in each of the subgroups 105 and 110 are configured by processors in the radar system (one embodiment of these processors are discussed at length below with respect to FIG. 3. The subgroup 105 transmits signals that constructively interfere and combine to form the beam signal 145. Outside of the beam signal 145, the transmitted signals destructively interfere, yielding the narrow field of the beam signal 145. This occurs due to the technique of beamforming. The signals transmitted by the subgroup 105 (which is arranged as a phased array) are configured such that the signals combine at certain angles (constructive interference) and negate each other (destructive interference) at other angles. Beamforming can be practiced at both the transmitting or the receiving end to achieve such spatial selectivity. In this embodiment, the beamforming is occurring at the transmit end. In this way, the transmitted signals constructively interfere to generate the beam signal 145. Similarly, the subgroup 110 transmits signals that constructively interfere to generate the beam signal 140.

Beam signal 145 can be defined by angle $\theta_1$ and angle $\theta_2$. As noted above, $\theta_2$ represents the angle between the z-axis and the edge of the beam signal 145 nearest the z-axis. Angle $\theta_1$ represents the angle between edge of the beam signal 145 nearest the z-axis and the edge of the beam signal 145 nearest the x-axis. The beam signal 140 will also have similar angle measurements. However, the angle $\theta_1$ and angle $\theta_2$ of the beam signal 140 will differ slightly than the angle $\theta_1$ and angle $\theta_2$ of the beam signal 145. This difference is due to the slightly different positions of the subgroups 105 and 110 along the x-axis and the signals being configured to scan the same portion of ground (in FIG. 1 the surface beam region 135). Meanwhile the relative positions of the subgroups 105 and 110 along the y-axis and z-axis are the same, even when the aircraft is in motion. The angle $\theta_1$ is related to the surface beam region 135. This is the area at a given moment that is being scanned by the beam signals 140 and 145. Although in FIG. 1 the beam signals 140 and 145 are portrayed as extending toward the ground as a planar beam, the beam signals 140 and 145 are actually conical or hyperboloidic in shape. In this way, the beam signals 140 and 145 scan the surface beam region 135. As a result, as the aircraft moves along the y-axis, all of the ground within a swath 125 is scanned. The width of the swath 125 is a function of the height of the aircraft and the angles at which the beam signals 140 and 145 are directed.

Another way to quantify or identify the beam signals 140 and 145 are through a look angle. The look angle is the nominal angle at which the scan is performed using the beam signals 140 and 145. The look angle is defined as the angle between a line through the center of a conical beam signal and the z-axis. Accordingly, if a beam signal was pointed straight down below the aircraft, it would have a look angle of zero degrees. The present embodiment shown in FIGS. 1-3 can synthesize beams that have look angles greater than 50 degrees to either side of the z-axis. That is, the radar system 100 can synthesizes beams with look angles across a range of more than 100 degrees.

In an alternative embodiment, the radar system 100 may also scan the swath 130. In such an embodiment, the radar system may utilize 4 subgroups of sub-arrays of the antenna instead of the 2 subgroups shown in FIG. 1. In another alternative embodiment, the radar system may scan only swath 130 instead of swath 125. In yet another embodiment, the radar system 100 may scan another swath entirely on the other side of the flight track line 115. In another embodiment, the radar system 100 may scan a swath that intersects with or tangentially touches the flight track line 115.

Once the beam signals 140 and 145 hit the surface of the earth (or any objects thereon) the beam signals 140 and 145 are reflected off of the surface of the earth (or any objects thereon). At least a portion of the reflected beam signals can travel back to the radar system 100 and be sensed by the antenna of the radar system 100. In this embodiment, both subgroups 105 and 110 can be used to receive the reflected beam signals. Since the beam signals 140 and 145 in this embodiment had different frequencies, a processor of the radar system 100 is able to differentiate the reflection signals that correspond to each of the beam signals 140 and 145. Objects on the surface of the earth may include such things as plants, other biomass, water, ice, soil, man-made structures or objects, a human being, an animal, a vehicle, a road, etc.

The received reflected beam signals are then processed into images. The images represent how the beam signals 140 and 145 have been reflected by the surface of the earth (or any objects thereon) as the aircraft flies along the y-axis. In this embodiment, the images are derived by measuring the phase of the received reflected beam signals as compared to a known phase of the transmitted beam signals 140 and 145. Measuring the phase of the reflected beam signals as the aircraft travels will reveal relative changes in the terrain.

However, just one image generated from the reflected signal of the beam signal 140 does not reveal a three dimensional topography of the surface of the earth (or any objects thereon) within the swath 125. Instead, two images (one from the reflected signal of the beam signal 140 and one from the reflected signal of the beam signal 145) are used to generate a terrain map of the scanned swath 125. This terrain map is also referred to as an interferogram, and is generated using phase interferometry and the aforementioned two images. Noise filtering, phase unwrapping, nominal aircraft height or expected terrain elevation, null-steering of the antenna pattern, or another beam signal (and a resulting third image) may also be used to generate the interferogram. Null-steering may be utilized to minimize noise or interference of a particular received or transmitted signal or in a particular channel of the radar system 100. In null-steering a received signal is weighted to minimize the effects of noise. For example, consider a radar system forming a single beam signal using four separate signals (or channels). if a particular signal (or channel) is experiencing high levels of interference or noise, that signal can be weighted lower in the processing (either generation of the signal or utilization of the signal to synthesize a beam on receive) to minimize or eliminate the effect of the noise or interference on the combined beam signal.

In the present embodiment, the beam signals 140 and 145 are generated simultaneously and continuously. Accordingly, the reflected beam signals are also received simultaneously and continuously. In alternative embodiments, the beam signals may be time-interleaved in a variety of ways.

Figure 2:
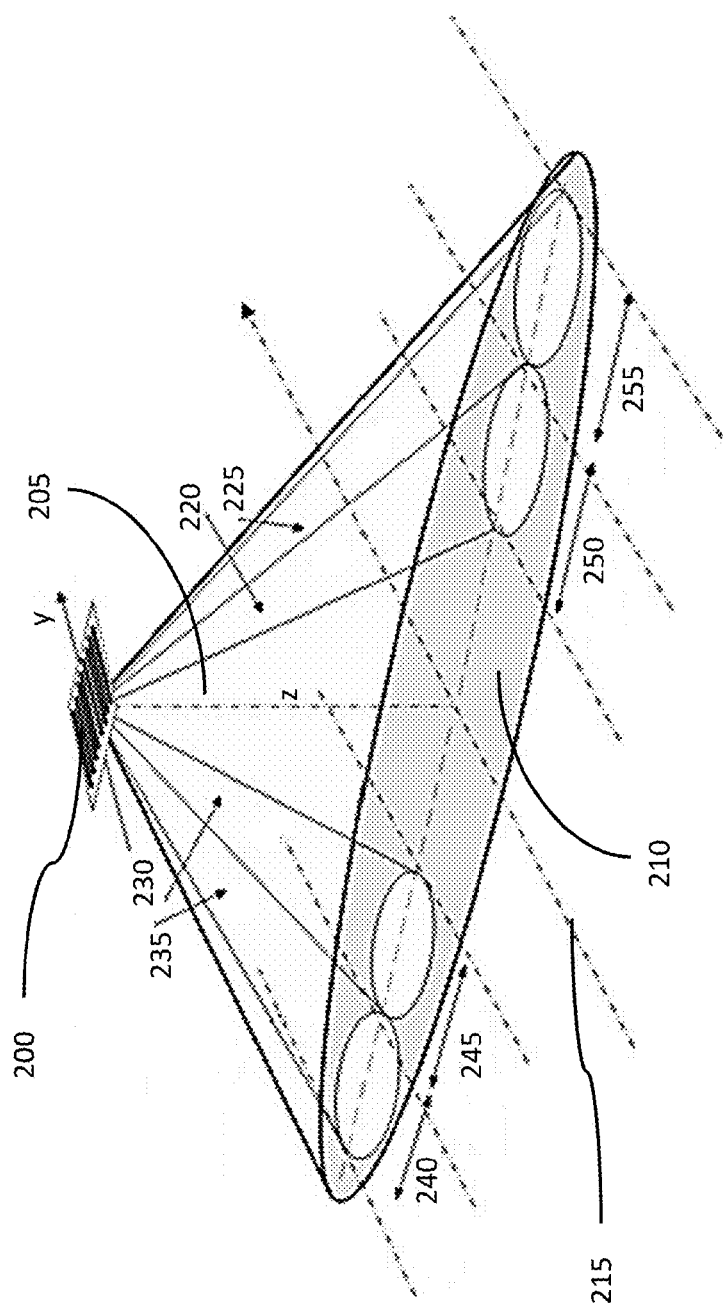
FIG. 2 is a diagram illustrating a radar system used for digital beamforming interferometry in a receive beamforming mode in accordance with an illustrative embodiment.
Figure 3:
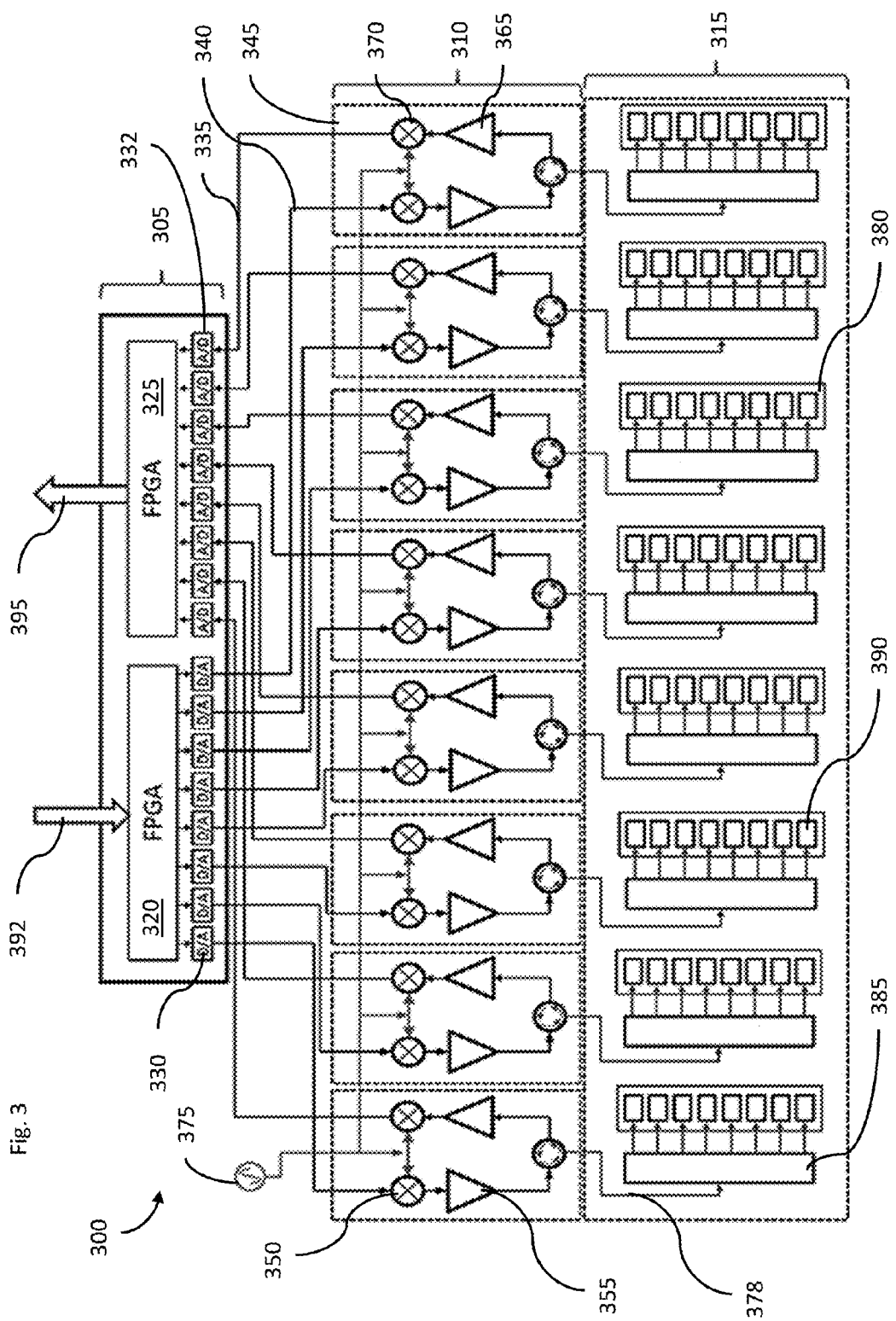
FIG. 3 is a diagram illustrating circuit components of a beamforming radar system in accordance with an illustrative embodiment.

In a first alternative embodiment, the beam signals 140 and 145 may be time-interleaved. In this embodiment, the beam signals 140 and 145 would be alternately transmitted such that two images of the swath 125 may still be generated from the reflected beam signals. Advantageously, this method may utilize only 2 sub-arrays in an antenna, as only one of beam signal 140 and beam signal 145 would need to be generated at any one time. However, in various embodiments of this time-interleaved method any number of sub-arrays may still be used. Similarly, power usage of the system may decrease if only one of beam signal 140 or beam signal 145 is being generated at any one time. In another embodiment utilizing time-interleaving generation of the beam signals 140 and 145, overall resolution of the images may increase. For example, if the architecture shown in FIGS. 1-3 is utilized, the radar system 100 could utilize all 8 sub-arrays of the antenna to generate beam signal 140, and alternate utilizing all 8 sub-arrays of the antenna to generate the beam signal 145. Utilizing additional sub-arrays to generate a beam signal may make a beam signal more focused (i.e. a narrower angle $\theta_1$) and yield higher resolution images. Thus, it may be advantageous to time-interleave the generation of beam signals 140 and 145.

In another embodiment, the radar system 100 may be utilized to scan multiple swaths, say swaths 125 and 130 for example. In this embodiment, if the swaths 125 and 130 were scanned simultaneously, 4 or more separate beam signals may be generated to scan the swaths 125 and 130. However, the swaths may be measured by time-interleaving the generation of the beams for each of the swaths 125 and 130. For example, two (or more) beam signals may be generated to scan swath 125 alternately with two (or more) beam signals being generated to scan swath 130. In this way, the radar system may be able to scan wider areas (i.e., more swaths) without increasing the capabilities of the radar system or the antenna size (i.e. number of sub-arrays in the antenna).

Figure 8:
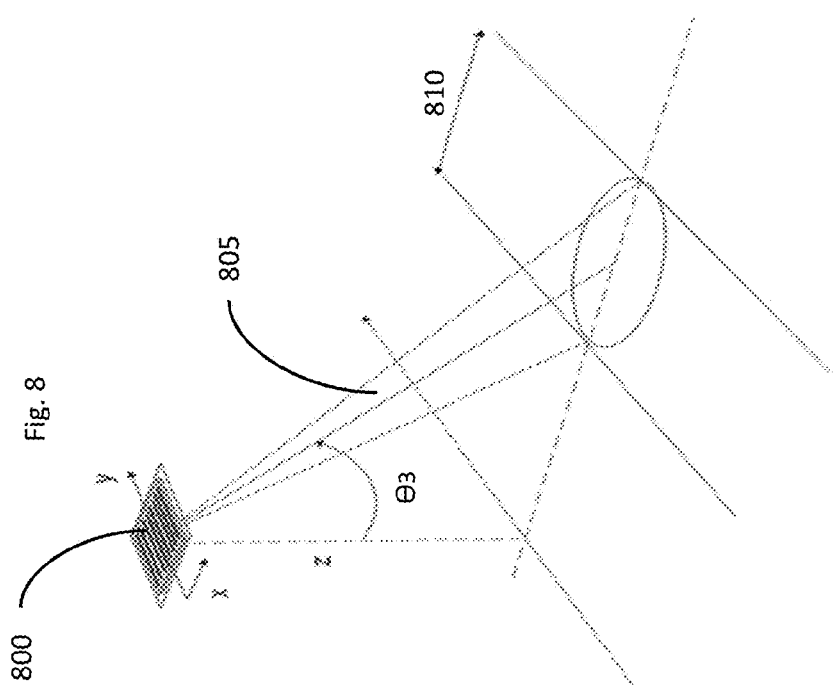
FIG. 8 is a diagram illustrating a radar system used for digital beamforming interferometry in a transmit beamforming mode demonstrating a transmit configuration in accordance with an illustrative embodiment.

FIG. 8 is a diagram illustrating a radar system 800 used for digital beamforming interferometry in a transmit beamforming mode demonstrating a transmit configuration in accordance with an illustrative embodiment. In alternative embodiments, fewer, additional, and/or different components may be included in the system. This embodiment corresponds to the first approach discussed above where the radar transmit signals are generated to form a single transmit beam of energy on either side of the flight track and, on receive, the reflected energy from the ground is collected by each individual channel and processed as two or more individual receive beams.

Figure 9:
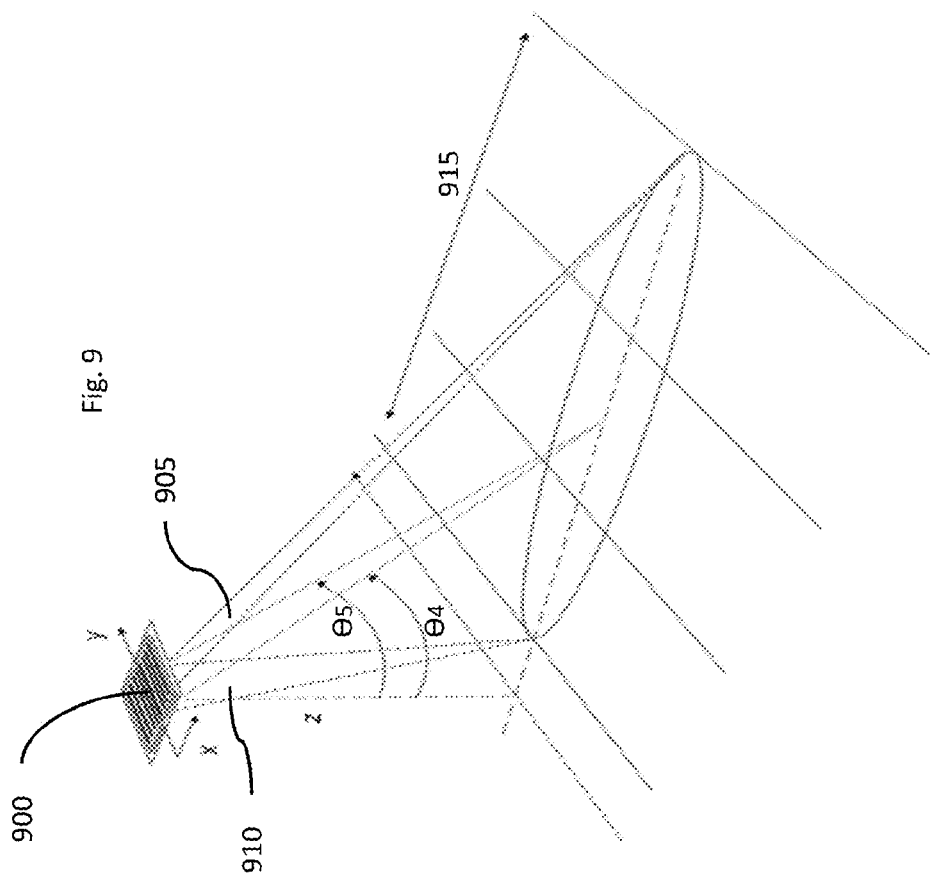
FIG. 9 is a diagram illustrating a radar system used for digital beamforming interferometry in a transmit beamforming mode demonstrating a receive configuration in accordance with an illustrative embodiment.

In FIG. 8, the radar system 800 transmits a focused beam signal 805 toward a ground surface. The focused beam signal 805 hits the ground surface at a swath 810. The focused beam signal 805 also has a look angle $\theta_3$. As discussed above with respect to FIG. 1, the look angle, as better represented here in FIG. 8, represents the center of a signal, here the focused beam signal 805. FIG. 8 illustrates the transmit configuration of the first approach discussed above (also referred to as the transmit beamforming mode). FIG. 9, discussed below, illustrates the receive configuration of the first approach discussed above (also referred to as the transmit beamforming mode). FIG. 8 shows only one beam signal 805. However, in alternative embodiments, the radar system 800 may synthesize multiple beam signals that look at swath 810 or other swaths (i.e., have other look angles) on either side of the radar system (i.e., the other side of the z-axis).

FIG. 9 is a diagram illustrating a radar system 900 used for digital beamforming interferometry in a transmit beamforming mode demonstrating a receive configuration in accordance with an illustrative embodiment. In alternative embodiments, fewer, additional, and/or different components may be included in the system. This embodiment corresponds to the first approach discussed above where the radar transmit signals are generated to form a single transmit beam of energy on either side of the flight track and, on receive, the reflected energy from the ground is collected by each individual channel and processed as two or more individual receive beams.

In FIG. 9, the radar system 900 receives signals at multiple sub-arrays of the antenna in the radar system 900. Here, the radar system 900 is shown as receiving two signals, signal 905 and signal 910. In alternative embodiments, the radar system may receive any number of signals, though the number of received signals may be limited by the number of sub-arrays in the antenna. However, with time-interleaving methods, the radar system 900 may receive more signals than there are number of sub-arrays. Signal 905 corresponds to a look angle $\theta_5$. Signal 910 corresponds to a look angle $\theta_4$. The received signals 905 and 910 bounce from a swath 915. In alternative embodiments, the radar system may also receive signals that bounce from other swaths (i.e., have different look angles), including swaths on the other side of the radar system (i.e., the other side of the z-axis).

Although the radar system 900 may receive signals that bounce from the entire swath 915, the radar system 900 may receive signals corresponding to a smaller portion of the swath 915, depending on any beam signals that were transmitted. For example, if the beam signal 805 of FIG. 8 was transmitted, the radar system could see any signals bouncing back from the entire swath 915, but would see strong signals bouncing back from the part of swath 915 that corresponds to the high energy beam signal 805 transmitted and aimed at the swath 810 of FIG. 8. Although it is beam signal 805 that is bounced back toward the radar system 900, signals 905 and 910 would appear as different signals because they correspond to the bounce-back of beam signal 805 because of the spatial displacement between the different sub-arrays that are receiving signals 905 and 910. Signals 905 and 910 are utilized to generate the images that can be used to generate an interferogram. Although, FIG. 9 only shows two signals 905 and 910, alternative embodiments may receive any number of signals from a bounced back beam signal, where the multiple signals bounced back are received by different sub-arrays in the antenna of the radar system 900.

FIG. 2 is a diagram illustrating a radar system 200 used for digital beamforming interferometry in a receive beamforming mode in accordance with an illustrative embodiment. In alternative embodiments, fewer, additional, and/or different components may be included in the system. This embodiment corresponds to the second approach discussed above, where individual signals may be transmitted (by means of time multiplexing or encoding each of the signals) to generate two or more transmit beams and where, on receive, the reflected energy from the ground is collected by each individual channel and processed as a single receive beam. FIG. 2 shows a radar system 200 that includes an antenna with 8 sub-arrays. Unlike FIG. 1, the sub-arrays are not shown in subgroups, although the physical number and shape of the antenna in FIGS. 1 and 2 are not structurally different. Advantageously, this means the same radar system may be used to perform both the receive beamforming mode discussed with respect to FIG. 2 and the transmit beamforming mode discussed with respect to FIG. 1.

In the present embodiment, the radar system 200 generates a wide-field signal 205 (as opposed to the narrow-field beam signals generated in FIG. 1) that is spread out along a large look angle. Here, the wide-field signal 205 hits the surface of the earth (or any object thereon) in the surface signal region 210. In this embodiment, one central sub-array may be utilized to transmit the wide-field signal 205. In other embodiments, multiple sub-arrays may be used to transmit the wide-field signal 205.

The wide-field signal 205 then reflects or backscatters back to the radar system 200. The backscattered or reflected wide-field signal 205 is received by the entire array of the antenna of the radar system 200. The radar system 200 can then process the signals received by the various sub-arrays of the radar system 200 in order to synthesize receive beams at various scan angles on both sides of the flight track line 215. For example, receive beams 220, 225, 230, and 235 may be synthesized, which correspond to swaths 250, 255, 240, and 245, respectively. In this embodiment, to generate two images for each of the swaths 250, 255, 240, and 245, at least two beams for each swath can be synthesized. In this embodiment, with 8 sub-arrays in the antenna, 4 separate receive beams may be synthesized at any one moment. Accordingly, in order to generate interferograms for each of the swaths 250, 255, 240, and 245, a time-interleaving strategy may be employed to generate the images corresponding to each swath. In alternative embodiments, the number of sythensized beams, swaths measured, images generated, sub-arrays in the antenna, and interferograms generated may be varied.

FIG. 10 is a diagram illustrating a radar system 1000 used for digital beamforming interferometry in a receive beamforming mode demonstrating a transmit configuration in accordance with an illustrative embodiment. In alternative embodiments, fewer, additional, and/or different components may be included in the system. This embodiment corresponds to the second approach discussed above, where individual signals may be transmitted (by means of time multiplexing or encoding each of the signals) to generate two or more transmit beams and where, on receive, the reflected energy from the ground is collected by each individual channel and processed as a single receive beam.

In FIG. 10, the radar system 1000 transmits signals from multiple sub-arrays of the antenna in the radar system 1000. Here, the radar system 1000 is shown as transmitting two signals, signal 1005 and signal 1010. In alternative embodiments, the radar system 1000 may transmit any number of signals, though the number of transmitted signals may be limited by the number of sub-arrays in the antenna. However, with time-interleaving methods, radar system 1000 may transmit more signals than there are number of sub-arrays. Signal 1005 corresponds to a look angle $\theta_6$. Signal 1010 corresponds to a look angle $\theta_7$. The transmitted signals 1005 and 1010 are signals that hit a swath 1015. In alternative embodiments, the radar system may also transmit signals that hit other swaths (i.e., have different look angles), including swaths on the other side of the radar system (i.e., the other side of the z-axis). FIG. 10 illustrates the transmit configuration of the second approach discussed above (also referred to as the receive beamforming mode). FIG. 11, discussed below, illustrates the receive configuration of the second approach discussed above (also referred to as the receive beamforming mode).

FIG. 11 is a diagram illustrating a radar system 1100 used for digital beamforming interferometry in a receive beamforming mode demonstrating a receive configuration in accordance with an illustrative embodiment. This embodiment corresponds to the second approach discussed above, where individual signals may be transmitted (by means of time multiplexing or encoding each of the signals) to generate two or more transmit beams and where, on receive, the reflected energy from the ground is collected by each individual channel and processed as a single receive beam.

In FIG. 11, the radar system 1100 receives a focused beam signal 1105 that has bounced from a swath 1110 of a ground surface. The focused beam signal 1105 has a look angle $\theta_8$. FIG. 11 shows only one beam signal 1105. However, in alternative embodiments, the radar system 1100 may receive multiple beam signals that look at swath 1110 or other swaths (i.e., have other look angles) on either side of the radar system (i.e., the other side of the z-axis).

Although the radar system 1100 may receive the focused beam signal 1105 from a swath 1110, the radar system 1100 may receive different focused beam signals corresponding to a different swath than the swath 1110. For example, if the signals 1005 and 1010 of FIG. 10 were transmitted, the radar system could see any focused beam signals bouncing back from the entire swath 1015, but the radar system can determine to see one or more of multiple focused beams signals from all of the swath 1015 or just one focused beams signal, as illustrated in FIG. 11. Different focused beam signals from a single swath, such as swath 1110 can also be received by different sub-arrays or combinations of sub-arrays of the antenna. Because of the spatial displacement between the different sub-arrays, receiving the focused beam signal 1105 at different antenna sub-arrays can be used to generate the images that can be utilized to generate an interferogram.

FIG. 3 is a diagram illustrating circuit components of a beamforming radar system 300 in accordance with an illustrative embodiment. In alternative embodiments, fewer, additional, and/or different components may be included in the system. The beamforming radar system 300 includes a waveform generator & data acquisition and processing system 305, radio frequency (RF) transceivers 310, and an antenna array 315.

The waveform generator & data acquisition and processing system 305 includes field programmable gate arrays (FPGA) 320 and 325. The FPGA 320 receives waveform and operation configuration from a host computer through connection 392. In one embodiment, this may be from a device such as a computing device 400 as discussed below with respect to FIG. 4. The FPGA 320 is used to control the channels (i.e., the signals to each of the sub-arrays of the antenna array 315). The FPGA 320 can be programmed to operate in a variety of embodiments disclosed herein. The signals for each channel are output from the FPGA 320 to digital to analog converters associated with each channel. An example of one of the digital to analog converters is digital to analog converter 330. As will be noted throughout FIG. 3, there are many similar elements, and many of them will be referred to be example elements, such as the digital to analog converter 330. Although the physical components of FIG. 3 that look similar may be similar in their physical makeup, they may not all be functioning exactly the same way or electrically transmitting the exact same signal at any moment. However, the similar elements referred to by the example element in FIG. 3 can be expected to behave similarly to its other similar elements if the same signals and conditions are subjected to it.

The signals from the digital to analog converters 330 are transmitted to the RF transceivers 310 through connections 340, where the signals are up-converted to a higher frequency band at elements 350. In this embodiment, an L-band frequency is utilized from frequency generator 375. The signals are amplified at amplifiers 355, and then are sent to feed networks 385 of the antenna array 315 through connections 378.

The signals are then transmitted through sub-arrays 380 that include antenna elements 390. In this embodiment, the antenna array 315 includes 8 sub-arrays 380, and each sub-array 380 includes 8 antenna elements 390. The numbers of sub-arrays 380 and antenna elements 390 can vary in alternative embodiments, as discussed above with regard to alternative embodiments of FIGS. 1 and 2.

After the signals have been reflected and returned to the antenna array 315, the signals pass back through the antenna elements 390, antenna sub-arrays 380, the feed networks 385, and the connections 378 to the RF transceivers 310. Because the reflected signals received are likely weaker (i.e. have significantly lower amplitudes) than the originally transmitted signals, the signals are amplified at amplifiers 365.

The signals are also down-converted from the L-Band at elements 370, utilizing again the frequency generator 375. In alternative embodiments, other frequencies may be used and generated by the frequency generator 375 than frequencies within the L-Band. The signals then pass through connections 335 to analog to digital converters 332 in the waveform generator & data acquisition and processing system 305. The signals then pass to the FPGA 325. In this scenario, the signals may be processed at the FPGA 325 to generate data for images, which are in turn used to create interferograms. In the alternative, the FPGA 325 may only process the data from the signals for storage so that another processing device can generate the images associated with the signals and the interferograms.

Figure 4:
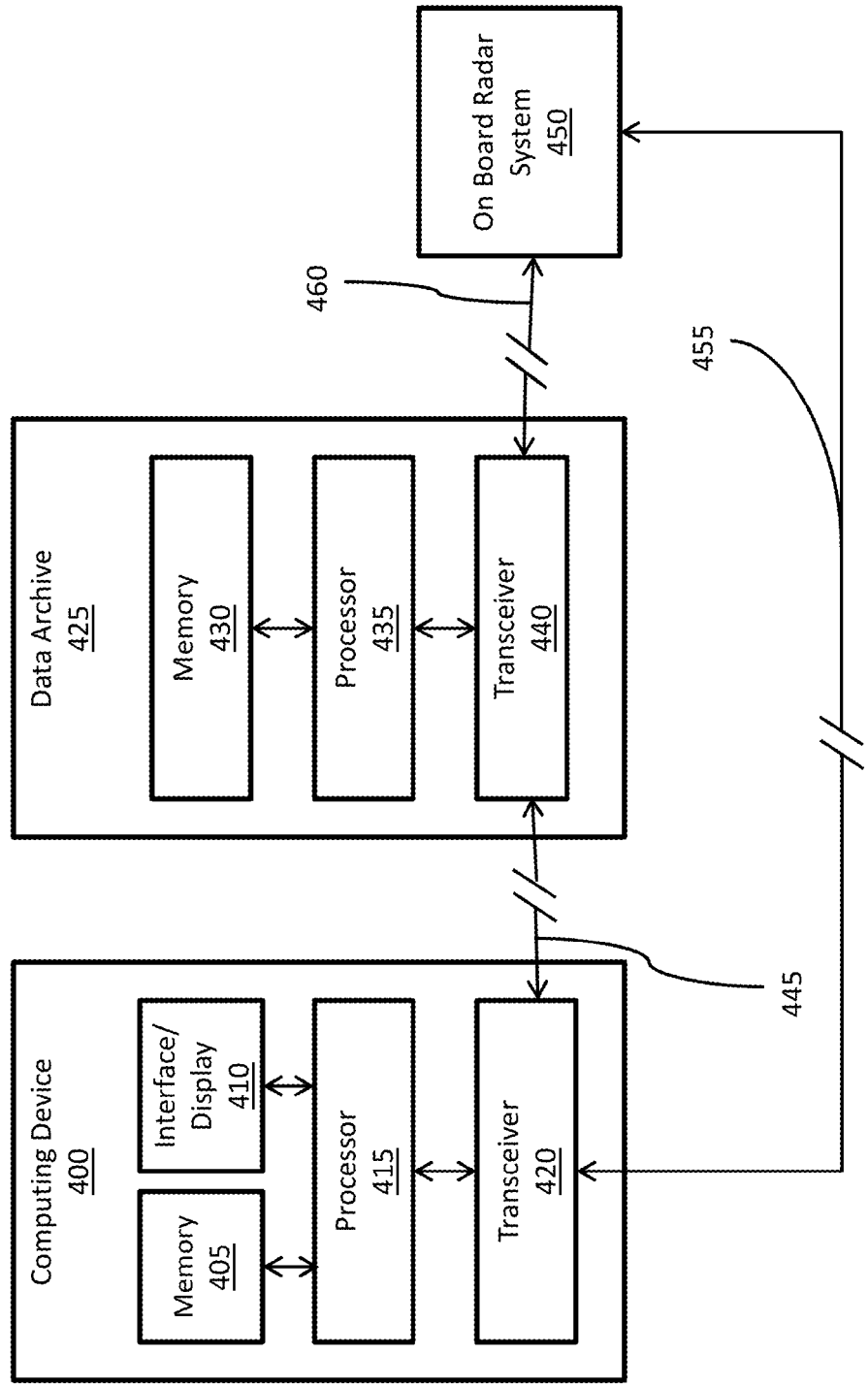
FIG. 4 is a block diagram illustrating a computing device and a data archive and a server that may be used in accordance with an illustrative embodiment.

FIG. 4 is a block diagram illustrating a computing device 400 and a data archive 425 that may be used in accordance with an illustrative embodiment. In alternative embodiments, fewer, additional, and/or different components may be included in the system. FIG. 4 also includes an on board radar system 450. The on board radar system 450 may be any of the radar systems depicted in or discussed in reference to FIGS. 1-3 above.

The computing device 400 includes a processor 415 that is coupled to a memory 405. The processor 415 can store and recall data and applications in the memory 405. The processor 415 can execute sets of instructions stored on the memory. In an example, a set of instructions may be a browser or a mobile application (app) or other software program. The set of instructions may also be programmed into certain hardware components that make them behave in a certain way, such as an FPGA. The memory 405 may also store a software program specially designed for use with the system disclosed herein and perform the methods disclosed herein. The processor 415 may also display objects, applications, data, etc. on an interface/display 410. The processor 415 is also coupled to a transceiver 420. With this configuration, the processor 415, and subsequently the computing device 400, can communicate with other devices, such as the data archive 425 or the on board radar system 450 through connections 445 and 455.

The data archive 425 includes a processor 435 that is coupled to a memory 430. The processor 435 can store and recall data and applications in the memory 430. For example, the data archive 425 may provide to the computing device 400 data on a recent flight and signals collected utilizing the on board radar system 450. The processor 435 is also coupled to a transceiver 440. With this configuration, the processor 435, and subsequently the data archive 425, can communicate with other devices, such as the computing device 400 through the connection 445 or the on board radar system 450 through a connection 460.

The devices shown in the illustrative embodiment may be utilized in various ways. For example, the connections 445, 455, and 460 may be varied. The connections 445, 455, and 460 may be a hard wired connection. In such an embodiment, the computing device 400, the data archive 425, and the on board radar system 450 may all be on board an aircraft or spacecraft. In other embodiments, the computing device 400 and/or the data archive 425 may be physically remote from the on board radar system 450 (and not on the aircraft or spacecraft). A hard wired connection may involve connecting the devices through a USB (universal serial bus) port, serial port, parallel port, or other type of wired connection that can facilitate the transfer of data and information between a processor of a device and a second processor of a second device, such as between the computing device 400 and the data archive 425. In another embodiment, the connections 445, 455, and 460 may be a dock where one device may plug into another device. While plugged into a dock, the computing device 400 may also have its batteries charged or otherwise be serviced. In other embodiments, the connections 445, 455, and 460 may be a wireless connection. Such a connection may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, the connections 445, 455, and 460 may represent several different computing devices and network components that allow the various devices to communicate through the internet, either through a hard-wired or wireless connection. The connections 445, 455, and 460 may also be a combination of several modes of connection.

To operate different embodiments of the system or methods disclosed herein, the various devices may communicate in different ways. For example, the computing device 400 may download or install software to interact with and/or control the data archive and the on board radar system 450. A website and browser interface may also be used. Advantageously, this prevents excessive download of software and programs onto the computing device 400. Such websites may perform or allow to be performed some or all of the processes, functions, and/or methods described herein. Additionally, the embodiments disclosed herein are not limited to being performed only on the disclosed devices in FIG. 1. It will be appreciated that many various combinations of computing devices may execute the methods and systems disclosed herein. Examples of such computing devices may include desktop computers, cloud servers, smart phones, personal computers, servers, laptop computers, tablets, blackberries, RFID enabled devices, or any combinations of such devices or similar devices.

The configuration of the data archive 425, the computing device 400, and the on board radar system 450 can be one physical system on which the disclosed embodiments may be executed. Other configurations of the devices shown may exist to practice the disclosed embodiments. Further, configurations of additional or fewer devices than the ones shown in FIG. 4 may exist to practice the disclosed embodiments. Additionally, the devices shown in FIG. 4 may be combined to allow for fewer devices or separated where more than the two devices shown exist in a system. In other embodiments, specialized hardware or software may exist on the devices shown in FIG. 4 that is specifically designed to perform or execute the various embodiments disclosed herein.

Figure 5:
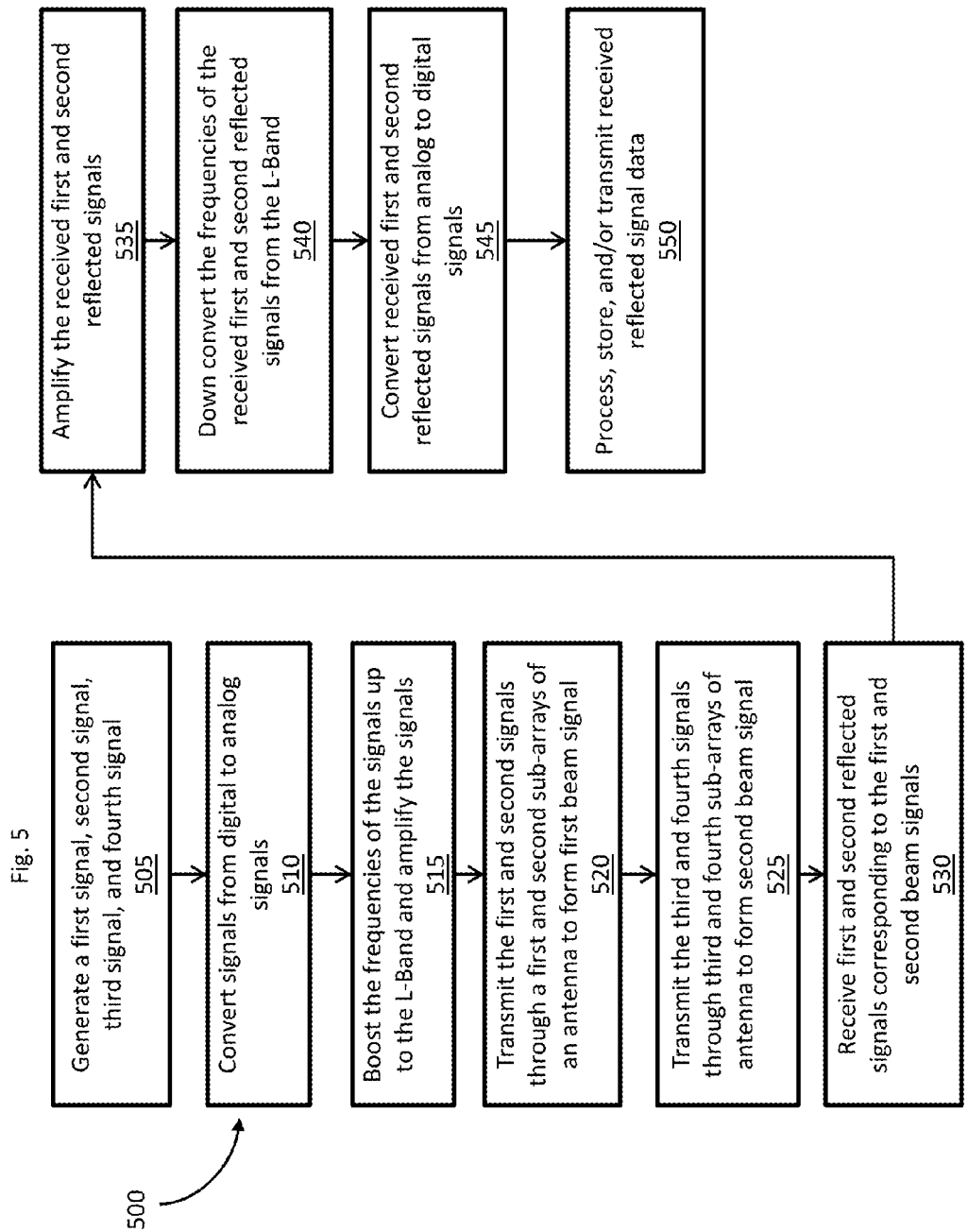
FIG. 5 is a flow diagram illustrating a method of a transmit beamforming mode in accordance with an illustrative embodiment.

FIG. 5 is a flow diagram illustrating a method 500 of a transmit beamforming mode in accordance with an illustrative embodiment. In alternative embodiments, fewer, additional, and/or different operations may be performed. Also, the use of a flow diagram is not meant to be limiting with respect to the order of operations performed. The operations disclosed with respect to FIG. 5 may be implemented on the physical systems disclosed herein with respect to FIGS. 1-4 discussed above.

In an operation 505, a first, second, third, and fourth signals are generated. In an operation 510, the first, second, third, and fourth signals are converted from digital to analog signals. In an operation 515, the frequencies of the first, second, third, and fourth signals are boosted to the L-Band and amplified to increase the amplitude of the signals.

In an operation 520, the first and second signals are transmitted through first and second sub-arrays of an antenna, respectively. The first and second signals are configured so that when transmitted in the operation 520, the first and second signals constructively interfere to generate a first beam signal.

In an operation 525 the third and fourth signals are transmitted through third and fourth sub-arrays of an antenna, respectively. The third and fourth signals are configured so that when transmitted in the operation 525, the third and fourth signals constructively interfere to generate a second beam signal.

In an operation 530, first and second reflected signals that correspond to the first and second beam signals are received. In an operation 535, the first and second reflected signals are amplified to increase the amplitude of the signals. In an operation 540, the received first and second reflected signals are down converted out of the L-Band of frequencies to lower frequencies. In an operation 545, the received first and second reflected signals are converted from analog to digital signals.

In an operation 550, the received reflected signal data is processed, stored, and/or transmitted. If there is no on board computing or processing device, the data from the signals may be stored for future analysis by another machine. If computing capabilities are present on board, the signal data may be used to generate images and interferograms. Additionally, the signal data may be transmitted to other devices either on board or not on board. The signal data may be transmitted to be processed, or the signal data may be transmitted to be stored, or both.

Figure 6:
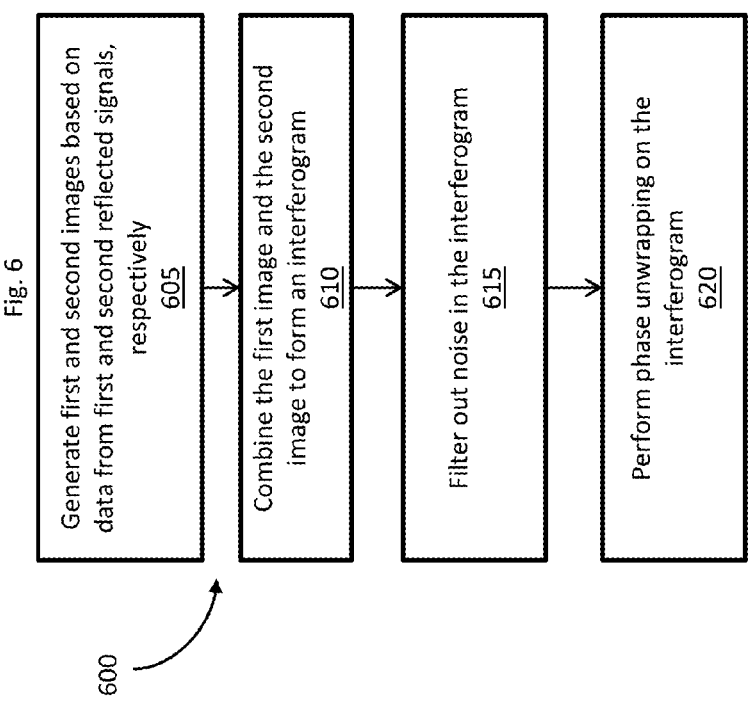
FIG. 6 is a flow diagram illustrating a method of generating an interferogram in accordance with an illustrative embodiment.

FIG. 6 is a flow diagram illustrating a method 600 of generating an interferogram in accordance with an illustrative embodiment. In alternative embodiments, fewer, additional, and/or different operations may be performed. Also, the use of a flow diagram is not meant to be limiting with respect to the order of operations performed. The operations disclosed with respect to FIG. 6 may be implemented on the physical systems disclosed herein with respect to FIGS. 1-4 discussed above.

In an operation 605, a first image and a second image are generated based on a first and a second reflected signal, respectively. In this embodiment, transmit beamforming mode is being utilized. In a receive beamforming mode, four reflected signals may be received and two beamformed signals may be synthesized from the four reflected signals. In the receive beamforming mode, these two synthesized beamformed signals may be used to generate the first and second images.

In an operation 610, the first image and the second image are utilized to form an interferogram image. In an operation 615, noise is filtered out of the interferogram. In an operation 620, a phase unwrapping is performed on the interferogram.

Figure 7:
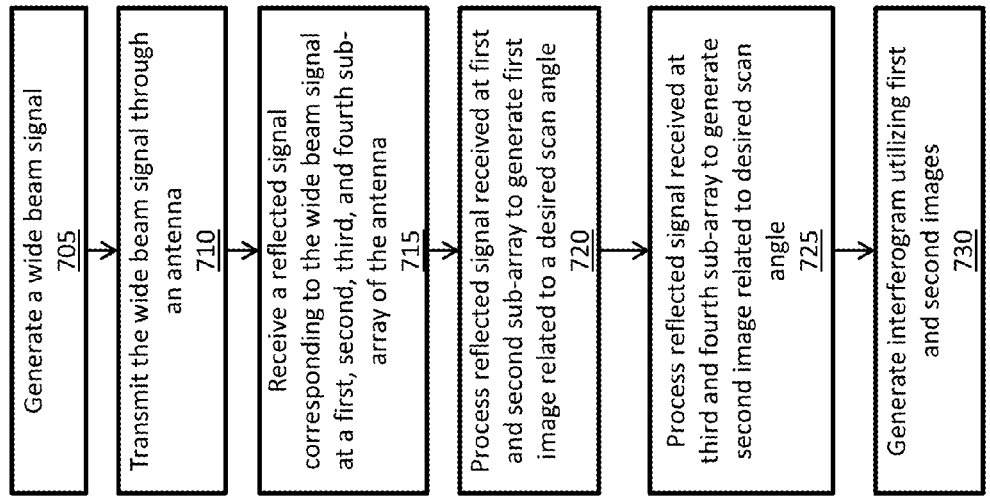
FIG. 7 is a flow diagram illustrating a method of a receive beamforming mode in accordance with an illustrative embodiment.

FIG. 7 is a flow diagram illustrating a method 700 of a receive beamforming mode in accordance with an illustrative embodiment. In alternative embodiments, fewer, additional, and/or different operations may be performed. Also, the use of a flow diagram is not meant to be limiting with respect to the order of operations performed. The operations disclosed with respect to FIG. 7 may be implemented on the physical systems disclosed herein with respect to FIGS. 1-4 discussed above.

In an operation 705, a wide beam signal is generated by a radar system. In an operation 710, the wide beam signal is transmitted through an antenna. In an operation 715, receive a reflected signal corresponding to the wide beam signal at first, second, third, and fourth sub-arrays of the antenna.

In an operation 720, the reflected and received signal received at the first and second sub-arrays is processed to generate a first image related to a desired scan angle. In an operation 725, the reflected and received signal received at the third and fourth sub-arrays is processed to generate a second image related to the desired scan angle. In an operation 730, the first and second images are utilized to generate an interferogram. In an example embodiment, a process such as that discussed with respect to FIG. 6 may be used to generate the interferogram.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
generating, by a processor of a computing device, a first signal, a second signal, a third signal, and a fourth signal, wherein each of the first signal, the second signal, the third signal, and the fourth signal have a frequency, a phase, and an amplitude;
transmitting, by the processor, from a first sub-array of a plurality of sub-arrays of an antenna, the first signal;
transmitting, by the processor, from a second sub-array of the antenna, the second signal, wherein a first signal amplitude, a first signal frequency, a first signal phase, a second signal amplitude, a second signal frequency, and a second signal phase are configured such that when the first signal and the second signal are transmitted simultaneously the first signal and the second signal constructively interact to form a first beam signal, and further wherein the first beam signal is configured to have a first look angle;
transmitting, by the processor, from a third sub-array of the antenna, the third signal;
transmitting, by the processor, from a fourth sub-array of the antenna, the fourth signal, wherein a third signal amplitude, a third signal frequency, a third signal phase, a fourth signal amplitude, a fourth signal frequency, and a fourth signal phase are configured such that when the third signal and the fourth signal are transmitted simultaneously the third signal and the fourth signal constructively interact to form a second beam signal, and further wherein the second beam signal is configured to have a second look angle;
receiving a first reflected signal by at least one sub-array of the plurality of sub-arrays of the antenna, wherein the first reflected signal comprises a reflected portion of the first beam signal, and wherein the reflected portion of the first beam signal has been reflected off of a first region within the first look angle;
receiving a second reflected signal by at least one sub-array of the plurality of sub-arrays of the antenna, wherein the second reflected signal comprises a reflected portion of the second beam signal, and wherein the reflected portion of the second beam signal has been reflected off of a second region within the second look angle; and
generating, by the processor, an interferogram utilizing information in the first reflected signal and the second reflected signal.

2. The method of claim 1, wherein the first region and the second region are approximately a single region.

3. The method of claim 2, wherein the antenna is aboard an aircraft or spacecraft, and further wherein the single region comprises a portion of a surface of earth and anything located on the portion of the surface of the earth.

4. The method of claim 3, wherein the single region is a function of the first look angle, the second look angle, and a height from the surface of the earth.

5. The method of claim 2, wherein the single region comprises a plant, water, ice, soil, a man-made structure or object, a human being, an animal, a vehicle, or a road.

6. The method of claim 2, wherein the interferogram indicates relative heights of the single region and anything located on the single region.

7. The method of claim 2, wherein the interferogram indicates a relative velocity of an object within the single region.

8. The method of claim 1, wherein the plurality of sub-arrays of the antenna comprise a phased array configuration.

9. The method of claim 1, wherein each of the plurality of sub-arrays of the antenna comprise antenna elements and further wherein the antenna elements are arranged in a phased array configuration.

10. The method of claim 1, further wherein the first signal and the second signal destructively interact at a third look angle and the third signal and the fourth signal destructively interact at a fourth look angle.

11. The method of claim 10, wherein the third look angle and the fourth look angle are approximately the same and further wherein the first look angle and the second look angle are approximately the same.

12. The method of claim 10, wherein a first lobe of the first beam signal is located within the first look angle and not within the third look angle, and further wherein a first lobe of the second beam signal is located within the second look angle and not within the fourth look angle.

13. The method of claim 12, further comprising controlling the first lobe of the first beam signal and the first lobe of the second beam signal by adjusting the first signal, the second signal, the third signal, and the fourth signal according to a desired predefined first look angle, a desired predefined second look angle, a desired predefined ground swath width that corresponds to the first beam signal and the second beam signal, and a predefined desired sidelobe level.

14. The method of claim 1, further comprising:
generating, by the processor, a fifth signal;
transmitting, by the processor, the fifth signal from a fifth sub-array of the antenna, wherein the fifth signal is transmitted simultaneously with the first signal and the second signal, wherein the first signal, the second signal, and the fifth signal constructively interact to form the first beam signal; and performing a null-steering procedure to reduce interference with the fifth signal, wherein the fifth signal is weighted to account for the interference.

15. The method of claim 1, wherein the first signal frequency is approximately the same as the second signal frequency, the second signal frequency is different from the third signal frequency, and wherein the third signal frequency is approximately the same as the second frequency.

16. The method of claim 15, wherein the first signal phase is different from the second signal phase, and further wherein a phase difference between the first signal phase and the second signal phase is a function of a physical distance between the first sub-array and the second sub-array, the first signal frequency, and a desired look angle of the first beam signal.

17. The method of claim 1, wherein the first beam signal and the second beam signal are transmitted simultaneously.

18. The method of claim 1, wherein generating the interferogram comprises:
  generating a first image from the first reflected signal, wherein the first image is generated by measuring changes in phase of the first reflected signal;
  generating a second image from the second reflected signal, wherein the second image is generated by measuring changes in phase of the second reflected signal;
  combining the first image and the second image to form the interferogram;
  filtering out noise from the interferogram; and
  performing a phase unwrap of the interferogram.

19. An apparatus comprising:
  a memory;
  a processor coupled to the memory; and
  a set of instructions stored on the memory and configured to be executed by a processor, wherein the processor is configured to:
    generate a first signal, a second signal, a third signal, and a fourth signal, wherein each of the first signal, the second signal, the third signal, and the fourth signal have a frequency, a phase, and an amplitude;
    transmit, from a first sub-array of a plurality of sub-arrays of an antenna, the first signal;
    transmit, from a second sub-array of the antenna, the second signal, wherein a first signal amplitude, a first signal frequency, a first signal phase, a second signal amplitude, a second signal frequency, and a second signal phase are configured such that when the first signal and the second signal are transmitted simultaneously the first signal and the second signal constructively interact to form a first beam signal, and further wherein the first beam signal is configured to have a first look angle;
    transmit, from a third sub-array of the antenna, the third signal;
    transmit, from a fourth sub-array of the antenna, the fourth signal, wherein a third signal amplitude, a third signal frequency, a third signal phase, a fourth signal amplitude, a fourth signal frequency, and a fourth signal phase are configured such that when the third signal and the fourth signal are transmitted simultaneously the third signal and the fourth signal constructively interact to form a second beam signal, and further wherein the second beam signal is configured to have a second look angle;
    receive a first reflected signal by at least one sub-array of the plurality of sub-arrays of the antenna, wherein the first reflected signal comprises a reflected portion of the first beam signal, and wherein the reflected portion of the first beam signal has been reflected off of a first region within the first look angle;
    receive a second reflected signal by at least one sub-array of the plurality of sub-arrays of the antenna, wherein the second reflected signal comprises a reflected portion of the second beam signal, and wherein the reflected portion of the second beam signal has been reflected off of a second region within the second look angle; and
    generate an interferogram utilizing information in the first reflected signal and the second reflected signal.

20. A non-transitory computer readable medium having instructions stored thereon that, upon execution by a computing device, cause the computing device to perform the operations comprising:
  generating a first signal, a second signal, a third signal, and a fourth signal, wherein each of the first signal, the second signal, the third signal, and the fourth signal have a frequency, a phase, and an amplitude;
  transmitting, from a first sub-array of a plurality of sub-arrays of an antenna, the first signal;
  transmitting, from a second sub-array of the antenna, the second signal, wherein a first signal amplitude, a first signal frequency, a first signal phase, a second signal amplitude, a second signal frequency, and a second signal phase are configured such that when the first signal and the second signal are transmitted simultaneously the first signal and the second signal constructively interact to form a first beam signal, and further wherein the first beam signal is configured to have a first look angle;
  transmitting, from a third sub-array of the antenna, the third signal;
  transmitting, from a fourth sub-array of the antenna, the fourth signal, wherein a third signal amplitude, a third signal frequency, a third signal phase, a fourth signal amplitude, a fourth signal frequency, and a fourth signal phase are configured such that when the third signal and the fourth signal are transmitted simultaneously the third signal and the fourth signal constructively interact to form a second beam signal, and further wherein the second beam signal is configured to have a second look angle;
  receiving a first reflected signal by at least one sub-array of the plurality of sub-arrays of the antenna, wherein the first reflected signal comprises a reflected portion of the first beam signal, and wherein the reflected portion of the first beam signal has been reflected off of a first region within the first look angle;
  receiving a second reflected signal by at least one sub-array of the plurality of sub-arrays of the antenna, wherein the second reflected signal comprises a reflected portion of the second beam signal, and wherein the reflected portion of the second beam signal has been reflected off of a second region within the second look angle; and
  generating an interferogram utilizing information in the first reflected signal and the second reflected signal.

* * * * *